United States Patent
Dannenberg

(10) Patent No.: US 8,128,030 B2
(45) Date of Patent: Mar. 6, 2012

(54) LINE SYSTEM FOR AN AIRCRAFT

(75) Inventor: Heiko Dannenberg, Hedersleben (DE)

(73) Assignee: Airbus Operations GmbH, Hamburg (DE)

( * ) Notice: Subject to any disclaimer, the term of this patent is extended or adjusted under 35 U.S.C. 154(b) by 373 days.

(21) Appl. No.: 11/923,909

(22) Filed: Oct. 25, 2007

(65) Prior Publication Data

US 2008/0185478 A1 Aug. 7, 2008

(30) Foreign Application Priority Data

Oct. 26, 2006 (DE) .................. 10 2006 050 534

(51) Int. Cl.
*B64C 1/00* (2006.01)

(52) U.S. Cl. ......... 244/119; 244/120; 244/131; 244/132

(58) Field of Classification Search .................. 244/119, 244/120, 131, 132, 117 R, 1 R, 134 D, 228, 244/129; 307/9.1
See application file for complete search history.

(56) References Cited

U.S. PATENT DOCUMENTS

| | | | | | |
|---|---|---|---|---|---|
| 2,473,728 | A | * | 6/1949 | Rutledge | ...................... 52/586.1 |
| 2,686,640 | A | * | 8/1954 | Neel, Jr. et al. | ........... 244/134 D |
| 3,268,187 | A | * | 8/1966 | Younkin et al. | ............... 244/228 |
| 3,579,215 | A | * | 5/1971 | Brasket | .................... 340/870.34 |
| 3,601,521 | A | | 8/1971 | Morton | |
| 3,800,121 | A | * | 3/1974 | Dean et al. | .................... 219/202 |
| 3,930,626 | A | * | 1/1976 | Croswell, Jr. | ................. 244/219 |
| 4,313,777 | A | * | 2/1982 | Buckley et al. | ............ 156/272.2 |
| 4,746,389 | A | * | 5/1988 | DiGenova | ...................... 156/247 |
| 4,779,820 | A | * | 10/1988 | Lambert | .......................... 244/49 |
| 4,781,609 | A | * | 11/1988 | Wilson et al. | .................. 439/215 |
| 4,942,078 | A | * | 7/1990 | Newman et al. | ............... 428/192 |
| 5,233,252 | A | * | 8/1993 | Denk | ...................... 310/216.106 |
| 5,332,178 | A | * | 7/1994 | Williams | ................... 244/123.3 |
| 5,473,111 | A | * | 12/1995 | Hattori et al. | .................. 174/363 |
| 5,594,573 | A | * | 1/1997 | August | ............................ 349/13 |
| 5,698,316 | A | * | 12/1997 | Kuras et al. | .................... 428/344 |
| 5,806,797 | A | * | 9/1998 | Micale | .......................... 244/120 |
| 5,841,414 | A | * | 11/1998 | Tanaka | ............................. 345/87 |
| 6,123,562 | A | * | 9/2000 | King et al. | ..................... 439/215 |
| 6,227,492 | B1 | * | 5/2001 | Schellhase et al. | ........ 244/134 D |
| 6,286,790 | B1 | * | 9/2001 | Thorpe | .......................... 244/214 |
| 6,375,120 | B1 | * | 4/2002 | Wolnek | ....................... 244/123.8 |
| 6,554,225 | B1 | * | 4/2003 | Anast et al. | ............... 244/117 R |

(Continued)

FOREIGN PATENT DOCUMENTS

DE 3531028 A1 3/1987

OTHER PUBLICATIONS

Dec. 17, 2005 <http://vivin.net/pub/over_here/d114/in_c130.jpg>.*

(Continued)

*Primary Examiner* — Tien Dinh
*Assistant Examiner* — Justin Benedik
(74) *Attorney, Agent, or Firm* — Perman & Green, LLP

(57) ABSTRACT

A line system for an aircraft, in particular an airplane, having multiple assemblies, in particular multiple fuselage sections of a fuselage cell and multiple wing shells, the line system including multiple lines for transmitting power and/or information, wherein the lines are integrated on and/or in a support layer, the support layer being situated on and/or in the shell-shaped assemblies.

7 Claims, 2 Drawing Sheets

U.S. PATENT DOCUMENTS

| | | | |
|---|---|---|---|
| 6,572,054 B1 * | 6/2003 | Smallhorn | 244/119 |
| 6,802,479 B2 * | 10/2004 | Howe et al. | 244/129.1 |
| 6,818,831 B2 * | 11/2004 | Petrenko | 174/110 R |
| 6,870,139 B2 * | 3/2005 | Petrenko | 219/482 |
| 6,981,671 B1 * | 1/2006 | Baron et al. | 244/1 A |
| 6,983,092 B2 * | 1/2006 | Kondo | 385/49 |
| 7,059,565 B2 * | 6/2006 | Scown et al. | 244/117 R |
| 7,086,874 B2 | 8/2006 | Mitchell et al. | |
| 7,124,983 B2 * | 10/2006 | Chow et al. | 244/134 D |
| 7,513,458 B2 * | 4/2009 | Layland et al. | 244/134 D |
| 2005/0120652 A1 * | 6/2005 | Cacciani et al. | 52/302.1 |
| 2006/0038070 A1 | 2/2006 | Henley et al. | |
| 2006/0102784 A1 | 5/2006 | Callahan et al. | |
| 2006/0118676 A1 * | 6/2006 | Novak et al. | 244/129.1 |

OTHER PUBLICATIONS

German Examination Report.

* cited by examiner

LINE SYSTEM FOR AN AIRCRAFT

BACKGROUND

1. Field

The disclosed embodiments relate to a line system for an aircraft, in particular an airplane, having multiple lines, the aircraft comprising multiple assemblies, in particular multiple fuselage sections of a fuselage cell and multiple wing shells.

2. Brief Description of Related Developments

Shell construction finds widespread use in aircraft construction. For this purpose, pre-finished fuselage cells are assembled into so-called "barrels" (complete fuselage sections) to produce a fuselage cell. The fuselage shells for forming fuselage sections may be formed using aluminum sheets, for example. The fuselage sections are subsequently arrayed with one another to form the fuselage cell and are thereafter attached to one another, for example, by conventional rivet connections. Corresponding methods are used in the production of airfoils, elevator units, rudder units, and landing flaps or the like.

Advantageously also a shell construction may be used if fiber-reinforced plastic materials are employed, in particular carbon-fiber-reinforced epoxy resin. As an alternative it is possible to particularly produce a fuselage cell in one piece with these materials, e.g. applying the winding method.

After the fuselage cell has been finished and the equipment is being installed, lines of all types are introduced and laid in the fuselage cell, the airfoils, the elevator unit, and the rudder unit. The lines to be introduced into the airplane are, for example, electrical lines for power and/or information transmission as well as optical lines, which are exclusively intended for data transmission.

The individual electrical lines are generally assembled into cable bundles. The course of the cable bundles often extends over the entire spatial extent of the airplane. The cable bundles have a large volume and weight and are held together using special cable binders. In addition, the cable bundles may only be manually introduced, laid, and fixed in position in the aircraft structure with a high expenditure in cost and personnel. Typically additional free lines being reserved for future functionalities are not provided for reasons of weight.

Modifications in the cabling may currently be implemented only with difficulty, because in certain circumstances individual lines must be localized in the cable bundles to remove them from the bundle and possibly replace them by alternative lines. The insertion of lines into an existing cable bundle is also complicated, because in this case the cable bundle must also be opened and subsequently bound together again.

In addition, there is always a risk that chafing points will form between the individual lines in the cable bundle, which result in an impairment of the mechanical integrity of the line insulation and may only be detected with difficulty. Kinks, disconnections, short-circuits, or cable fires may be caused in this way.

It would be advantageous to provide a line system and cabling for airplanes, respectively, which significantly reduces the outlay for wiring and which in addition allows changes in the line arrangement at reasonable expenses which are possibly required later. Further a high availability and/or a low probability of breakdown of the cabling and/or the line system is to be provided.

Because the lines are an integral component of the assemblies, the cabling of an airplane may be implemented at comparatively low expenses.

SUMMARY

The disclosed embodiments may be used both in assemblies made of aluminum sheets and also in assemblies which are manufactured using composite materials. In addition, the line system may also be used in mixed forms of these production methods. In the case of assemblies, in particular in the form of shells made of aluminum sheets for producing fuselage sections, airfoils, elevator units, or rudder units of an airplane, they are preferably provided with a support layer, to which the lines are then applied or were previously applied. A fuselage cell is formed by multiple fuselage sections that are arrayed one behind the other and connected to each other. In case the lines are electrical lines, the lines are generated on the support layer, which is implemented in this case as electrically insulating, for example, by printing, painting, spraying, or vapor depositing an electrically conductive agent and represent electrical "printed conductors" in a stricter sense, which are comparable to the (copper) printed conductors used in electronics on conventional circuit boards. The line material for the printed conductors is preferably aluminum or copper.

As an alternative the support layer may also be implemented as an insulating flexible film, to which a conductive layer made of aluminum or copper, for example, is applied. By etching those areas of the conductive layer which are not to be conductive, electrical lines ("printed conductors") having nearly arbitrary geometrical shapes may be implemented on the film similarly as in circuit board manufacturing in the field of electronics.

Furthermore, the cabling and the line system, respectively, may also comprise optical conductors according to the present invention. In this case, the support layer is not necessarily implemented as electrically insulating. The optical conductors (optical waveguides) may be arranged on and/or in the support layer.

In case assemblies are made from composite materials, for example, from carbon-fiber or fiberglass-reinforced epoxy resin, at least electrical and/or optical lines having a small cross-section may be integrated directly in the fiber reinforcement, in particular woven therewith and/or embedded therein. This procedure is also advantageously applicable in fuselage cells which are produced in one piece in the winding method.

In fiberglass-reinforced composite components, the lines may be used on one hand for mechanical reinforcement of the resin matrix and on the other hand for relaying information. Separate insulation of the optical lines is then no longer necessary. The cabling and/or the line system according to the present invention has, inter alia, the advantage that cable retainers for fixing the position of the cable bundles are no longer necessary, so that expenses for mounting is reduced. Furthermore, cable binders for forming cable bundles may be dispensed with without a replacement, which significantly reduces the mounting effort.

Because the lines are already an integral part of the pre-finished assemblies, the assemblies may be formed in the usual way to form a fuselage cell. To finish the cabling or the entire line system of the airplane in the equipping phase, it is only still necessary to connect the lines to one another in the area of the seam points between the assemblies by suitable coupling elements.

In the case of a fuselage cell formed from multiple arrayed fuselage sections ("barrels"), the lines already integrated in the fuselage cells and the fuselage sections, respectively, are only connected by coupling elements in the area of the transverse seams between the fuselage sections to finish the line system. To attach electrical or optical consumers, for example, junction elements are looped into the lines. For this purpose, the fuselage sections are assembled from multiple, in particular four fuselage shells (top shell, bottom shell, at least one floor frame, two side shells).

Because of the low weight and the small spatial dimensions, multiple optical or electrical reserve lines may additionally be easily provided, which are used for repair purposes and/or changes of the circuitry. Required changes on the line system or the cabling of the airplane may be performed easily, for example, by changing over from one line to a reserve line. In addition, a high fault tolerance and redundancy of the line system is achieved.

In a refinement of the line system, the lines are at least locally arranged on the surface of and/or in the assemblies.

In this way, the lines may be integrated in the assemblies before the assemblies are joined together, so that the complex line guiding typically required for an aircraft may be implemented significantly more simply than with a conventional wiring construction.

According to a further advantageous design, coupling elements for connecting the lines are arranged between the assemblies, in particular in the area of transverse seams between the fuselage sections.

The coupling elements may be implemented, depending on whether electrical or optical lines are to be connected, in the form of typical electrical plug connectors and/or as optical plug connectors, for example. In this way, in the course of mounting the individual fuselage sections to form a fuselage cell the complete electrical line system is assembled.

According to another advantageous design, junction elements for attaching the required electrical and/or optical components to the line system are preferably arranged in the area of the coupling elements.

The electrical components are electrical consumers or electrical sources, such as lighting units, motors, air-conditioning units, onboard electronics, actuators, measurement sensors, generators, batteries, accumulators, or the like. Optical components are, for example, optical waveguides, optical signal transmitters, or optical signal receivers for information transmission.

In a further advantageous design, the assemblies are particularly formed using a fiber-reinforced plastic material, the lines either being integrated in the fiber reinforcement or are themselves part of the reinforcement of the composite components.

In this way, a failsafe line system may be implemented, which is additionally producible in parallel with the production process of the assembly. If necessary, supplementary security precautions against impacts of foreign bodies ("impact strength") must be provided. This may be performed by mechanical armor in the form of metallic inserts, for example.

According to another advantageous refinement of the line system, the assemblies are particularly formed using riveted sheets that are made of an aluminum alloy, the lines being at least partially fixed to the aluminum alloy sheets.

If in particular electrical lines are to be fixed directly to the aluminum alloy sheets, which are typically electrically conductive, sufficient insulation of the line wire by sheathing or the like is necessary. The lines may be implemented, for example, as discrete round sheathed lines, as ribbon lines, or the like.

In an assembly which is formed by a sufficiently electrically insulating composite material, at least electrical lines may be generated directly on the interior sides of the assemblies in the form of printed conductors, for example. Insulation may be produced by applying a cover lacquer or the like, for example. For lines in the form of optical waveguides, the problem of electrical insulation generally does not exist in regard to the assembly material, however, a plastic sheathing ("insulation") of the actual optical fibers and/or of the optical waveguides may be necessary as an additional mechanical protection and/or to avoid the coupling of external optical interference radiation into the optical waveguides, for example.

In a further embodiment, a support layer is at least locally applied to an interior side of the aluminum alloy sheets, the lines particularly running on and/or in the support layer.

The support layer, which is preferably implemented as electrically insulating, allows, for example, the application of electrical lines in the form of printed conductors even on assemblies made of an electrically conductive material without problems. This is for example the case with shells being formed by aluminum alloy sheets in a conventional method of manufacturing. The line system according to the present invention may thus be employed in the scope of the currently typical shell manufacturing method using aluminum sheets, and there are no considerable changes of the manufacturing process necessary.

In addition, the electrical printed conductors are preferably implemented previously on and/or in the support layer, which then only still needs to be glued onto the interior side of the aluminum sheets in the case of a preferably self-adhesive embodiment. Furthermore, discrete electrical and/or optical conductors may additionally or exclusively be integrated on and/or in the support layer, the support layer subsequently being applied to the interior side of the assembly.

For assemblies which are manufactured using carbon-fiber-reinforced composite materials, it is also necessary to provide a support layer or, if electrical lines are applied directly to the interior side of the carbon-fiber composite component, to provide additional insulation by sheathing, because of the electrical conductivity of the carbon fibers, which is typically not negligible.

In addition, the line system according to the present invention having the lines integrated in the assemblies allows a visually aesthetic arrangement of the lines, because it is almost "invisible".

DESCRIPTION OF THE DRAWINGS

Other advantageous embodiments of the line system are subject of the respective claims.

In the drawing.

In the drawing, same constructive elements have identical reference numerals.

DESCRIPTION OF THE DISCLOSED EMBODIMENTS

Figure 1:
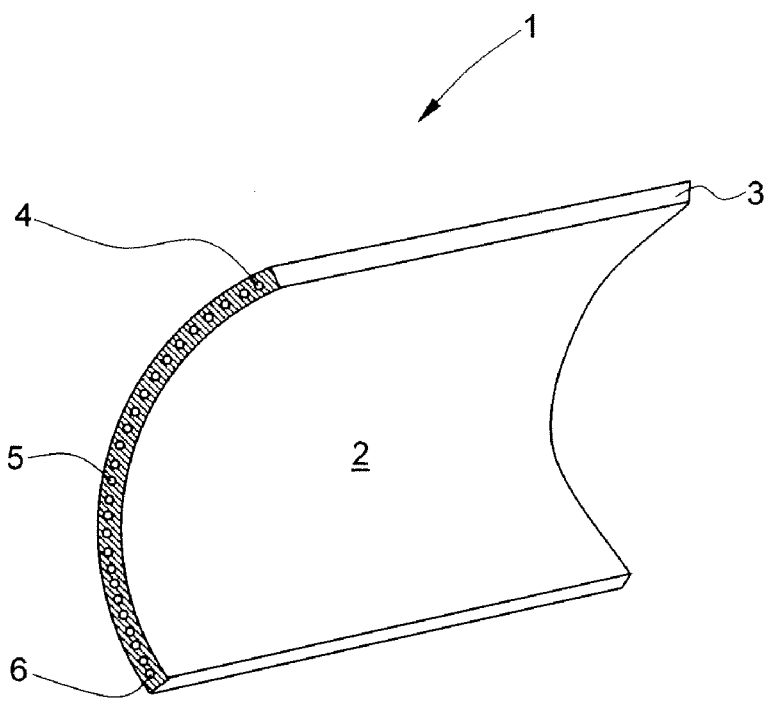
FIG. 1 shows a section through an assembly having lines running within the structure of the assembly.

FIG. 1 shows a section through an assembly having a line system integrated directly in the structure.

The assembly 1 is a side shell 2 for forming a fuselage section (so-called "barrel") (not shown) in the exemplary embodiment shown. The fuselage section may be assembled with a further side shell, a top shell, a bottom shell, and at least one floor frame to form a complete fuselage section, for example. A complete fuselage cell for an airplane is formed from multiple fuselage sections arrayed one behind another and permanently connected to one another.

The side shell 2 is formed using a fiber-reinforced plastic material 3, for example, a carbon-fiber-reinforced epoxy resin. Multiple electrical lines are laid directly in the fiber-reinforced composite material 3, of which only the electrical lines 4 through 6 are provided with a reference numeral for the sake of better overview of the drawing. The electrical lines 4 through 6 may be embedded in the resin matrix of the fiber-reinforced composite material 3. In this case, the electrical lines 4 through 6 are laid on the fiber reinforcement before the impregnation process of the composite component. Furthermore, it is possible to apply the electrical lines 4 through 6 on the already finished side shell 2, i.e., impregnated with resin, by gluing or the like. Alternatively, the electrical lines 4 through 6 may also be embedded directly in or laid on the fiber reinforcement of the composite material 3 or woven therewith or connected in another way. In this case, the fiber reinforcement having the electrical lines situated therein is first impregnated after completed integration of the lines. As a result, the electrical lines 4 through 6 represent an integral component of the side shell 2 according to the present invention.

The electrical lines 4 through 6 may be conventional lines having at least one electrical conductor and an insulating sheath enclosing it. The conductors may be formed by aluminum or copper. The electrical lines 4 through 6 may, for example, also be implemented as a so-called ribbon line having multiple electrical lines running parallel to one another. Notwithstanding this, optical conductors may additionally or exclusively be integrated in the side shell 2 in a way that corresponds to the integration of electrical lines. The optical conductors may have at least one optically active waveguide, which may be provided with a sheath made of plastic if necessary.

The line system according to the disclosed embodiments may be integrated in a particularly advantageous way in assemblies which are formed by fiberglass-reinforced plastic materials. In this case it is possible to use the glass fibers, which are employed for mechanical reinforcement, as optical lines ("optical waveguides") for the simultaneous transmission of information. Furthermore, the line system may be used for the integral cabling of assemblies which are formed by a multilayered layer construction made of aluminum films and layers situated in between which are made of a fiberglass-reinforced plastic material (GLARE®). In this case, the glass fibers are used on one hand for information transmission and on the other hand for the mechanical reinforcement of the structure. In addition, mechanical strains of the glass fibers, for example, in the form of tensile forces, may be measured and analyzed directly in certain circumstances by a change of their optical properties thus caused ("integral sensor system", so-called "health monitoring"), so that occurrences of fatigue in the structure may be recognized in a timely manner, for example.

The line system according to the disclosed embodiments easily allows the production of the complete wiring of an aircraft. To finish the complete wiring, it is only still necessary to connect the lines already integrated in the assemblies after mounting the (individual) assemblies. Typically complex cabling of the airplane in a so-called equipment phase following the shell construction phase may be dispensed with without substitution. In addition, changes may be performed on the cabling relatively easily, because it is possible without further measures, due to the low weight of the electrical lines 4 through 6 implemented according to the present invention, to integrate a larger number of initially unused reserve lines in the assembly. Additionally required line capacities may be achieved easily by connecting in these reserve lines.

Figure 2:
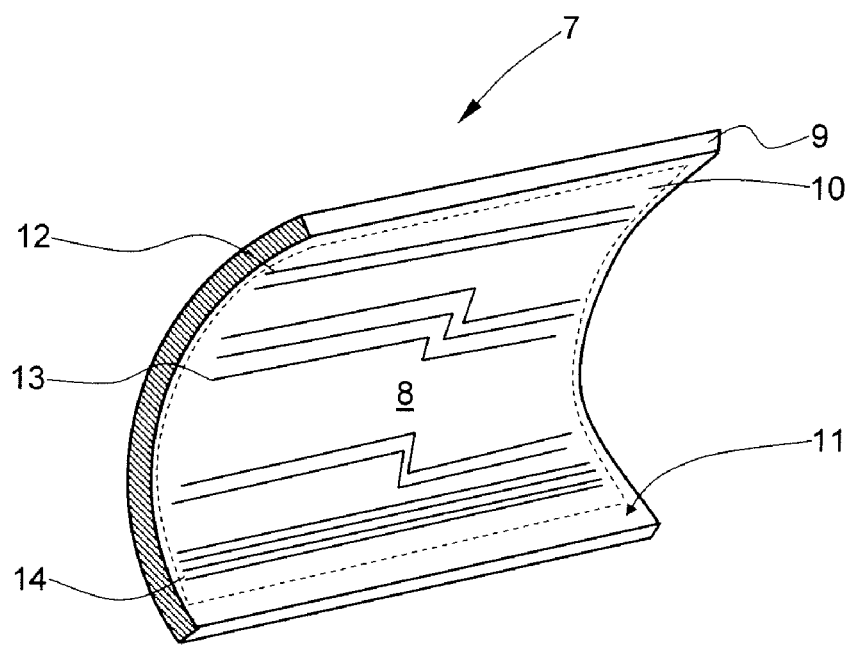
FIG. 2 shows a side view of an assembly having lines applied to a support layer.

FIG. 2 shows an assembly having multiple lines applied to the structure of the assembly.

The assembly 7 is again implemented as a side shell 8. Notwithstanding the particular embodiment according to FIG. 1, however, the side shell 8 is not formed by a fiber-reinforced plastic material, but rather by an aluminum alloy sheet 9.

To achieve adequate insulation, an electrically insulating support layer 10 is at least locally applied to an interior side 11 of the aluminum alloy sheet 9. The support layer 10 may be implemented as self-adhesive, for example, to make it easier to apply to the interior side 11 of the aluminum alloy sheet 9. Alternatively, the support layer 10 may also be painted on or formed in another way. Multiple electrical lines are then applied to the support layer 10, of which only the electrical lines 12 through 14 are provided with a reference numeral as representative for the others. The electrical lines 12 through 14 may be formed by painting, vapor deposition, printing, or the like on the support layer 10 and represent printed conductors in the stricter definition. The electrical lines 12 through 14 may also be integrated directly in the support layer 10. In this case, separate electrical insulation of the electrically conductive wires integrated in the support layer is not necessary. Furthermore, it is possible to provide the support layer 10 with a continuous electrically conductive coating, for example, a thin copper layer. Those areas of the support layer 10 which are to be electrically conductive may be formed in an etching process which is comparable to the etching process in conventional circuit board manufacturing. Nearly arbitrary geometrical shapes of the electrical lines 12 through 14 may be produced, which are then also provided in the form of printed conductors.

Instead of or in addition to the electrical lines 12 through 14, optical lines may also be introduced directly into the support layer 10 or applied thereto. An electrically insulating support layer is typically not necessary on a side shell 8 which is formed by an electrically insulating fiber-reinforced plastic material. In the case of carbon-fiber-reinforced plastic materials, however, the conductivity of the carbon fiber reinforcement may make an electrically insulating support layer necessary.

The embodiments described above of the line system according to the disclosed embodiments may be used correspondingly for the complete, pre-finished cabling of airfoils, elevator units, rudder units, or landing flaps of an airplane.

Figure 3:
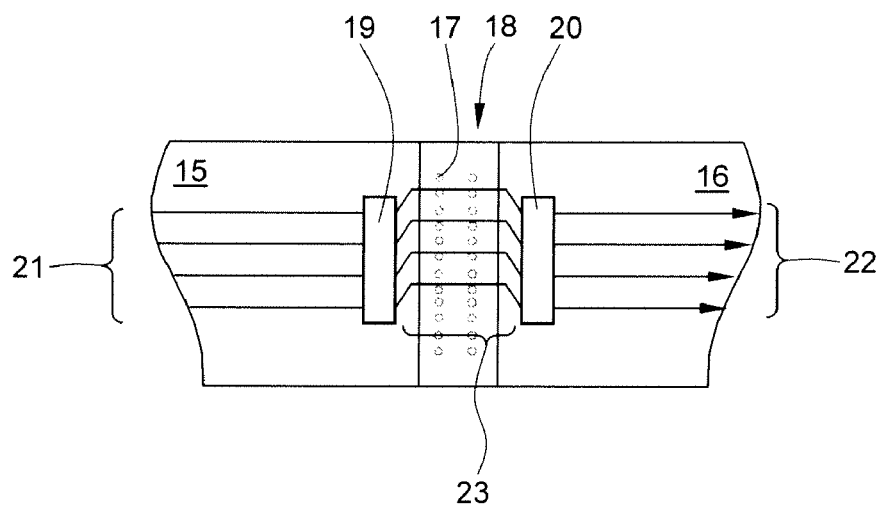
FIG. 3 shows a top view of a coupling element between two assemblies.

FIG. 3 shows the connection of two assemblies using a coupling element. A first assembly 15 is connected to a second assembly 16 in a conventional way by a rivet connection 17 while forming a transverse seam 18. The assemblies 15, 16 may be complete fuselage sections, for example, which are each formed in conventional rivet construction using aluminum sheets. Coupling elements 19, 20 are situated on both sides of the transverse seam 18. The electrical lines 21 are connected to the coupling element 19 and the electrical lines 22 are connected to the coupling element 20. The direction of the flow of information and/or power in the electrical lines is indicated in each case by arrows. To complete the electrical connection between the first assembly 15 and the second assembly 16, the coupling elements 19, 20 are connected to one another by individual electrical lines 23 running above the assemblies 15, 16 or by a suitable ribbon cable, providing in addition to the required electrical contacting of the line system integrated in the assemblies sufficient mechanical flexibility of the line system against bending movement between the assemblies. The electrical contacting between the electrical lines 21, 22 and 23 within the coupling elements 19, 20 is preferably performed using electrical terminal connections which are quick to mount. For the case in which the lines 21, 22, 23 are partially or completely implemented as optical conductors, an optically active connection is produced using appropriately implemented coupling elements 19, 20.

Figure 4:
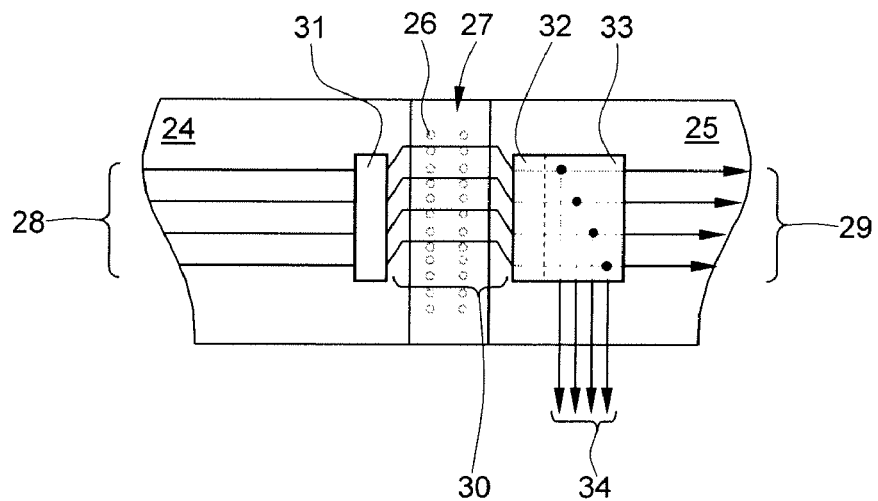
FIG. 4 shows a top view of a junction element.

FIG. 4 shows the connection of two assemblies and the attachment of electrical consumers or sources using a coupling element and a junction element.

A first assembly 24 is connected to a second assembly 25 by a rivet connection 26 while forming a transverse seam 27.

The electrical connection between the lines 28 and 29 is performed by the discrete electrical lines 30 running above the assemblies 24, 25, which are wired between the coupling elements 31, 32. The electrical lines 30 may also be implemented as a ribbon cable, a film line, or the like. Notwithstanding the embodiment shown, the coupling elements 31, 32 may also be corrected directly, without the electrical lines 30 connected in between, by being plugged or clamped together. In the case of optical lines, the lines 30, for example, in the form of flexible optical conductors situated parallel to one another, may be implemented to transmit optical signals. In this case, however, a direct optical plug connection is preferably used between the coupling elements 31, 32, to keep the transmission losses low and increase the transmission security.

A junction element 33 is situated behind the coupling element 32, by which the electrical status of the lines 29 is simultaneously led to the electrical and/or optical lines 34. As a result, there is a so-called "1 to 1 interconnection" between the electrical lines 29 and 34. Other interconnections may also occur within the junction element 33. For example, electrical consumers of all types or sources such as generators or electrical secondary or primary elements may be attached to the lines 34. The coupling element 32 and the junction element 33 are preferably integrated in one component, but may also be implemented as separate components in an alternative embodiment (not shown). In addition, the coupling element 32 and the junction element 33 may be combined in one component, to which the (junction) lines 34 may be attached if necessary. If the coupling element 31 may additionally be electrically and/or optically coupled directly to the coupling element 32 and the junction element 33 thus combined, the separate electrical and/or optical lines 30 may also be dispensed with.

For the case in which optical conductors are at least partially used instead of the electrical lines 28 through 30 and 34, the coupling elements 31, 32 and the junction element 33 must be implemented as optical coupling elements having a sufficient optical "conductivity" to keep the transmission losses low and ensure sufficient transmission reliability.

According to the disclosed embodiments, the lines 4-6, 12-14, 21-23, 28-30, 34 are integrated directly in the assemblies 1, 7, 15, 16, 24, 25, before they are assembled to form larger structures. In the case of assemblies made of aluminum sheets and/or sheets made of aluminum alloys, a support layer is at least locally applied to an interior side of the assembly and/or implemented thereon, on and/or in which the lines run. For assemblies made of fiber-reinforced plastic materials, an especially elegant integration of the lines in the fiber reinforcement and/or in the surrounding resin matrix is possible. In the case of a fiberglass reinforcement, lines implemented as optical lines may even be directly implemented as a part of the fiber reinforcement. The lines are connected between the assemblies by optical and/or electrical coupling elements. Electrical and/or optical consumers or electrical and/or optical sources are attached to the line system by junction elements.

LIST OF REFERENCE NUMERALS 1 assembly
2 side shell
3 fiber-reinforced plastic material
4 electrical line
5 electrical line
6 electrical line
7 assembly
8 side shell
9 aluminum sheet
10 support layer
11 interior side (aluminum sheet)
12 electrical line
13 electrical line
14 electrical line
15 first assembly
16 second assembly
17 rivet connection
18 transverse seam
19 coupling element
20 coupling element
21 electrical lines
22 electrical lines
23 electrical lines
24 first assembly
25 second assembly
26 rivet connection
27 transverse seam
28 electrical lines
29 electrical lines
30 electrical lines
31 coupling element
32 coupling element
33 junction element
34 electrical lines

The invention claimed is:

1. A structural assembly for an aircraft comprising:
at least first and second aircraft fuselage sections constructed to be joined to form a larger aircraft assembly;
a support layer integrally constructed on a surface facing an interior of the aircraft of said at least first and second fuselage sections;
a line system comprising multiple paths for transmitting at least one of power and information, said line system integrally constructed on or in said support layer; and
couplings constructed in said at least first and second aircraft fuselage sections connected to said multiple paths, to connect the line system of said at least first and second fuselage sections, when said at least first and second fuselage sections are joined.

2. A structural assembly for an aircraft, according to claim 1, wherein the line system is comprised of: electrical lines, which are generated on the support layer by printing, painting, spraying, or vapor depositing an electrically conductive agent.

3. A structural assembly for an aircraft, according to claim 2, wherein the support layer is implemented as electrically insulating.

4. A structural assembly for an aircraft, according to claim 1 wherein the line system is comprised of optical conductors.

5. A structural assembly for an aircraft, according to claim 1, wherein at least one junction element is provided, in the area of the at least one coupling element for attaching at least one of electrical and optical components.

6. A structural assembly for an aircraft, according to claim 1 wherein the aircraft fuselage sections are made from a fiber-reinforced plastic material, the line system being situated in the fiber reinforcement.

7. A structural assembly for an aircraft, according to claim 1 wherein the aircraft fuselage sections are made from aluminum alloy sheets, the lines at least locally being fixed to the aluminum alloy sheets.

* * * * *